United States Patent [19]

Gies et al.

[11] Patent Number: 5,355,910

[45] Date of Patent: Oct. 18, 1994

[54] DUAL COMPONENT FLAP

[75] Inventors: Mark C. Gies, Leomister; Keith J. Nardone, Northborough, both of Mass.

[73] Assignee: TRW Inc., Cleveland, Ohio

[21] Appl. No.: 136,391

[22] Filed: Oct. 13, 1993

[51] Int. Cl.⁵ ............................................. F16K 15/16
[52] U.S. Cl. .................................... 137/858; 137/855
[58] Field of Search ............................... 137/855, 858

[56] References Cited

U.S. PATENT DOCUMENTS

| | | | |
|---|---|---|---|
| 441,339 | 11/1890 | Swann | 137/855 |
| 1,438,161 | 12/1922 | Zimmerman | 137/855 X |
| 3,295,547 | 1/1967 | Scaramucci | 137/858 X |
| 3,347,265 | 10/1967 | Groh | 137/858 |
| 4,064,905 | 12/1977 | Nilsson | 137/512.1 X |
| 4,304,265 | 12/1981 | Sell | 137/856 |
| 4,449,549 | 5/1984 | Weck | 137/855 X |
| 4,567,816 | 2/1986 | Kolt | 137/512.15 X |
| 4,696,263 | 9/1987 | Boyseen | 137/855 X |
| 4,972,765 | 11/1990 | Dixon | 137/855 X |
| 5,105,849 | 4/1992 | Clough | 137/855 X |
| 5,194,038 | 3/1993 | Klomhaus et al. | 137/855 X |

Primary Examiner—John Rivell
Attorney, Agent, or Firm—Fay, Sharpe, Beall, Fagan, Minnich & McKee

[57] ABSTRACT

A flap valve apparatus and an improved flap valve element which uses integrally bonded layers comprising a first soft flexible layer of an elastomer and a second layer of a rigid plastics material. The method of forming the flap valve element by a two component extrusion process is also disclosed.

15 Claims, 2 Drawing Sheets

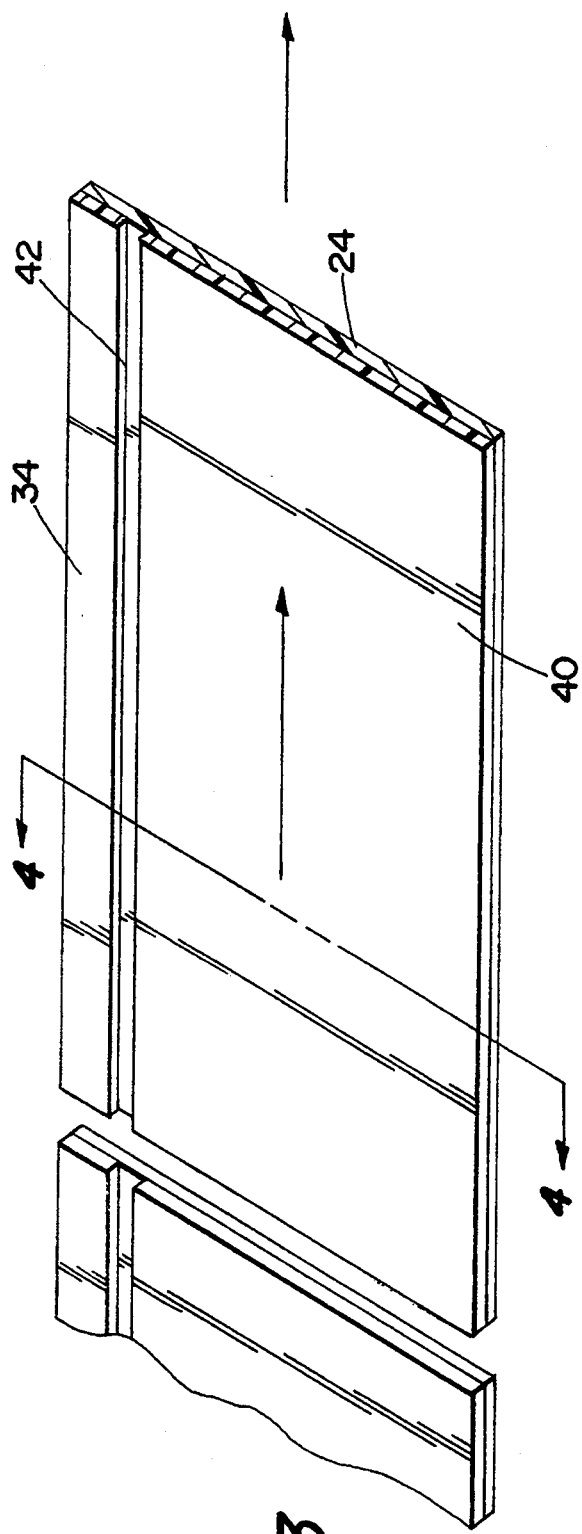
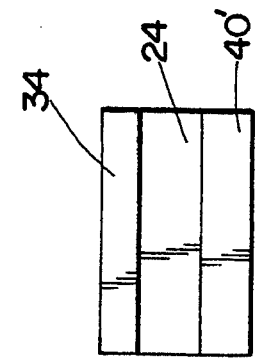
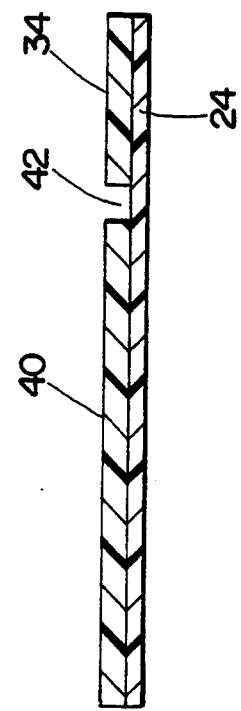

DUAL COMPONENT FLAP

BACKGROUND OF THE INVENTION

The subject invention is directed toward the valve art and, more particularly, to a flap-type valve element and method of forming same. The invention is especially suited for forming valve flaps for pressure relief valves of the type used to relieve air pressure in vehicle passenger compartments.

Flap-type valves are commonly used as pressure relief valves in motor vehicle passenger compartments to maintain the compartments at ambient air pressure and to relieve air pressure build-up which results during operation of intake vent fans, door closing, and the like. To assure proper flexing and adequate sealing, the flap valve elements have generally been formed from soft elastomeric or rubbery material such as polyvinyl chloride, polyethylene, or the like. Often, such flap elements exhibit a tendency to warp on initial use and to further warp or deform after long term normal use.

SUMMARY OF THE INVENTION

The subject invention provides a structure and method of forming the same which results in a flap valve element that is flatter and resists deformation better than the typical prior art element. The design is such that installation and use are simplified and the need for mounting plates and associated structure is reduced or eliminated.

In accordance with one aspect of the invention, there is provided a valve element for use in a flap-type pressure relief valve which comprises a first sheet of a relatively soft, flexible, elastomeric material having opposed first and second faces and a peripheral edge including a spaced pair of first and second lateral side edges. The first face is smooth and planar, and is adapted to function as a sealing face. A first strip of relatively rigid plastics material is bonded to the second face to extend continuously along and closely adjacent the first lateral side edge to provide a rigid mounting strip for joining the valve element to an associated valve body. Preferably, there is a second strip of relatively rigid plastics material bonded to the second face at a location closely adjacent the first strip to extend along the first strip with a gap between the first and second strips providing a hinge to allow relative pivoting movement therebetween.

The first strip of relatively rigid plastics material can be provided with fastener receiving openings. It assures a proper rigid mounting of the valve element to the associated valve body or frame structure. The presence of the second rigid strip on the first soft, flexible sheet prevents the valve element from warping or deforming in use. The soft resilient and flexible elastomeric material allows an integral living hinge structure to be provided between the two rigid strips and further results in good seal characteristics for the seal face.

Preferably, the first sheet is of uniform thickness throughout its extent. Also, the first face of the first sheet is preferably planar. It is also preferred that the second strip extend from the first strip across substantially the entire portion of the first sheet from the first strip to the second lateral side edge. It should be appreciated, however, that this second strip could be somewhat narrower to permit a free flexible peripheral edge on the first sheet.

In accordance with another aspect of the invention, the valve element is preferably formed using an extrusion molding technique wherein a continuous first thin sheet of relatively soft, flexible, elastomeric material having opposed first and second faces and a width "w" between first and second lateral side edges is extruded. Simultaneously with the extruding of the first sheet, a first strip of relatively rigid plastics material is extruded onto the second face of the first sheet along the first lateral side edge to bond to the first sheet. The first strip is extruded parallel to the first lateral side edge and is of a width "w" which is significantly less than one-half of "w." The extruded first sheet and first strip are cut into predetermined lengths by cutting across the width between the first and second lateral side edges. By extruding the first strip directly with the extruded first sheet, a bond is provided therebetween and a flap valve element having the desired characteristics results.

Preferably, in forming the valve element, a second strip of rigid plastics material is coextruded onto the first sheet simultaneously with the extrusion thereof, and it is extruded closely adjacent the first strip but with a narrow gap between the first and second strips so as to assure the presence of an uncovered portion of the first sheet to thereby provide a hinge area between the first and second strips of hard plastics material. After the extrusion is complete, the continuous strip of first sheet and first and second strips can be cut through conventional stamping operations into the desired peripheral shape or length to provide flap valve elements having the desired size and characteristics.

As can be seen from the foregoing, a primary object of the invention is the provision of a flap valve structure which has particularly desirable characteristics and is a unitary, one-piece structure that can be formed using conventional extrusion molding techniques.

A further object of the invention is the provision of a flap type valve element which is less likely to warp or deform during use.

Yet another object is the provision of a flap-type valve structure of the general type described which can be manufactured relatively simply and which includes integral mounting strips to eliminate the need for separate backing plates and the like.

BRIEF DESCRIPTION OF THE DRAWINGS

The above and other objects and advantages will become apparent from the following description when read in conjunction with the accompanying drawings wherein:

FIG. 3 is an isometric view showing the formation of a flap valve structure according to the subject invention;

FIG. 4 is a cross-sectional view taken on lines 4—4 of FIG. 3; and,

FIGS. 5 and 6 are plan views of alternative forms of flap valve elements formed in accordance with the subject invention.

DETAILED DESCRIPTION OF THE PREFERRED AND ALTERNATE EMBODIMENTS

Figure 1:
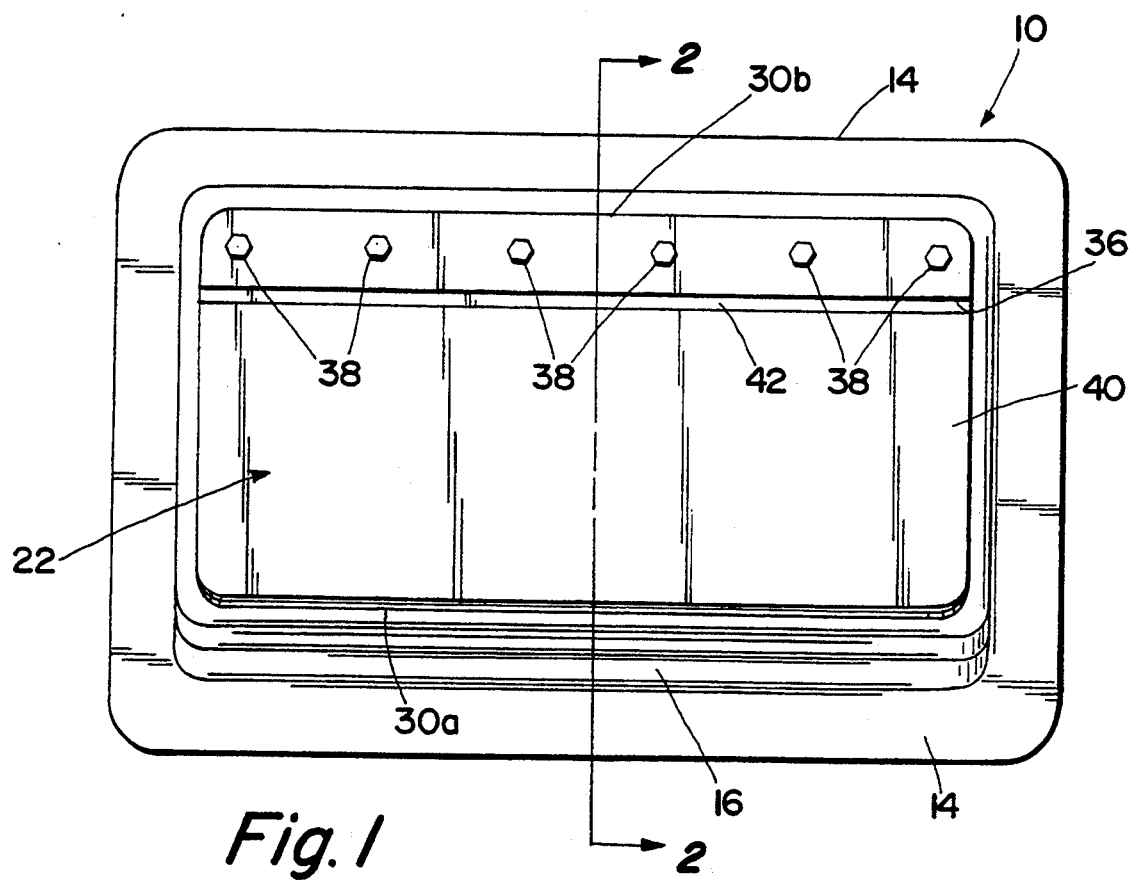
FIG. 1 is a front elevational view of a typical flap-type valve structure incorporating a valve element formed in accordance with the subject invention.
Figure 2:
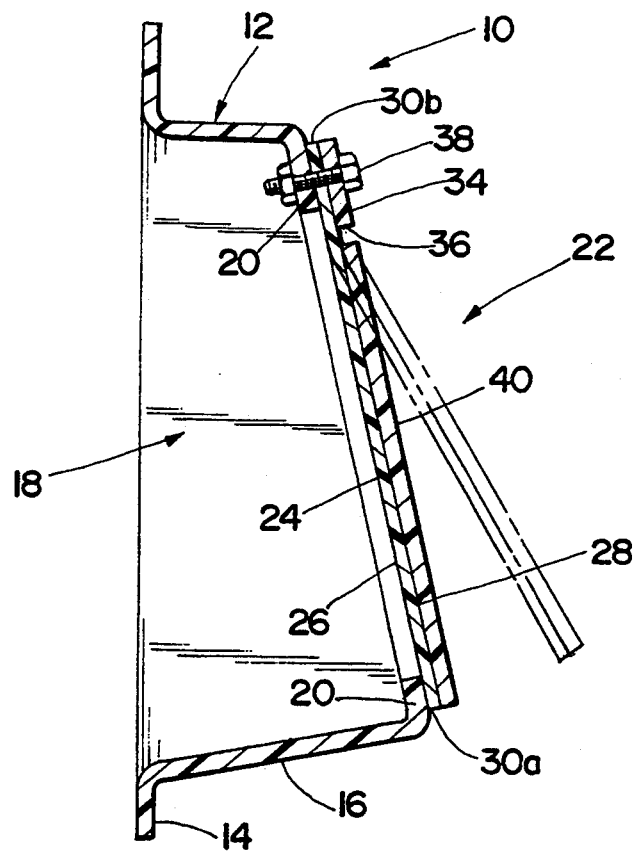
FIG. 2 is a cross-sectional view taken on lines 2—2 of FIG. 1.

Referring more particularly to the drawings wherein the showings are for the purpose of illustrating a preferred embodiment of the invention only and not for the purpose of limiting same, FIGS. 1 and 2 show a flap-type valve structure 10 of the general type used in vehicle body panels to relieve air pressure build-up within the passenger compartment by allowing discharge of air pressure to the exterior of the vehicle compartment. Generally, the structure shown is comprised of a main housing or frame 12 which comprises a continuous peripheral flat frame 14 with a peripheral, generally axially extending flange section 16. The frame 12 provides a generally rectangular air flow passage 18. At the right-hand side of the frame 12 (as viewed in FIG. 2) there is carried an inwardly extending lip 20 about the end of the flange 16. The lip 20 provides a valve seat structure for the valve flap 22.

With respect to the structure thus far described, it should be appreciated that the frame could have a variety of different structures within the scope of the subject invention. For example, many prior flap valve designs for the general use intended include multiple openings with separate valve flaps for each opening and such a structure could equally well use the improved valve flaps of the subject invention.

Referring again to FIGS. 1 and 2, it will be seen that the frame assembly 12 and the lip 20 are mounted such that the frame 14 is essentially vertically oriented. The valve flap 22 is inclined from the vertical so that under the influence of gravity, it assumes the normally closed position shown solid. However, the assembly is arranged such that when a pressure build-up takes place on the left-hand side of the valve flap as viewed in FIG. 2, the valve flap will move to an open position as shown in phantom in FIG. 2.

According to the invention, the valve flap 22 generally comprises an imperforate first sheet of relatively soft and flexible elastomeric material 24 which is preferably of uniform thickness throughout its extent and has a size and shape to allow it to completely overlie the valve body through passage and engage the seat area of the flange 20. This general relationship can be seen in FIGS. 1 and 2. The sheet 24 includes a first face 26 and a second, opposed face 28. The faces 26 and 28 are bounded by a peripheral edge 30 of generally rectangular shape including a pair of spaced lateral side edges 30a and 30b. Extending along the lateral side edge 30b and bonded to the second face 28 of the valve flap 22 is a first strip 34 of a relatively rigid plastics material which functions as a rigid mounting strip for joining the valve flap 22 to the associated valve body or frame 12. As mentioned, the strip 34 is permanently bonded to the sheet 24 and has an inner lateral edge 36 which is preferably straight and parallel to edge 30b of sheet 24. The total width of strip 34 is significantly less than one-half the width of sheet 24 and provides means by which the valve flap can be rigidly mounted to the frame assembly 12. In this embodiment, a plurality of machine screws or bolts 38 pass through aligned openings in the strip 34 and in the upper portion of flange 20 to firmly bolt and hold the flap valve in operative position. The presence of the integral and bonded strip 34 obviates the need for additional metal clamping strips or the like.

Preferably, the valve flap 22 further includes a second, longitudinally extending strip 40 which is also formed of a rigid plastics material having a relatively uniform thickness across its width. The second strip 40 is permanently and integrally bonded to the second face 28 of sheet 24. As illustrated in FIGS. 1 and 2, the second strip 40 is adjacent to, and runs generally parallel to, the edge 36 of strip 34. However, the strip 40 is preferably spaced a distance therefrom so as to leave a narrow gap 42. Gap 42 permits the sheet 24 to flex along the line defined by the gap 42 and thus serve as an integral living hinge to allow the necessary relative pivoting movement between the strip 40 and the mounting strip 34.

In the preferred embodiment, strip 40 extends from the noted point closely adjacent edge 36 completely across the remaining portion of sheet 24 to the lower lateral edge 30a. Sheet 40 thus adds rigidity to the lower section of the flap valve 22 and prevents warping and flexing of the valve flap. Additionally, the sealing advantages of the flexible sheet 24 are retained, and the sheet 24 provides the necessary hinge functioning. The resulting structure is, however, a unitary, one-piece structure.

Forming of the sheet can be carried out in many different ways. Preferably, however, it is formed using conventional extrusion molding techniques. FIGS. 3 and 4 show the formation of the flap valve element by way of extrusion molding techniques. As shown in FIG. 3, the first sheet 24 is extruded to the total width desired, and the first strip 34 is extruded directly on top of the sheet 24, as shown in FIG. 4. Also, the second strip 40 is simultaneously extruded across the remaining portion of the sheet 24 with the gap 42 controlled to the desired width. The somewhat rigid strips 34 and 40 facilitate handling of the entire extruded assembly and allow it to be readily conveyed to a suitable press for shearing the continuous strip into the desired lengths to function as a flap valve assembly or structure. It should, of course, appreciated that various peripheral configurations and mounting screw openings and the like can be stamped or cut into the continuous strip while it is formed and severed to desired lengths.

FIGS. 5 and 6 show alternative possible forms for the flap valve element. As shown therein, FIG. 5 merely adds the mounting strip 34 and does not include the full second strip portion 40.

FIG. 6, like FIG. 3, uses a full mounting strip 34 but has a narrow strip 40' which is only along the lower edge portion 30a of the first sheet 24. This arrangement assures that the lower edge will maintain a flat, non-curved structure and adds additional weight to the valve element for assisting in moving to the closed position. Various other configurations and arrangements could obviously be used within the scope of the invention.

Many different plastics materials could be used for forming the valve elements of the subject invention. For example, thermoplastic olefinic elastomer, thermoplastic polyester elastomer, or thermoplastic polyurethane elastomer could be used for sheet 24 and polypropylene, polyester, or polyurethane could be used for the rigid strips 34, 40. Various other materials and combinations thereof could equally well be employed.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A valve element for use in a flap-type pressure relief valve comprising:
   a first sheet of a relatively soft flexible elastomeric material having opposed first and second faces and a peripheral edge including spaced first and second lateral side edges, the first face being smooth and planar and adapted to function as a sealing face; and,
   a first strip of relatively rigid plastics material bonded to the second face to extend continuously along and closely adjacent the first lateral side edge to provide a rigid mounting strip for joining the valve element to an associated valve body.

2. A valve element as defined in claim 1 wherein there is a second strip of relatively rigid plastics material bonded to the second face at a location closely adjacent the first strip to extend along the first strip with a gap between the first and second strips providing a hinge to allow relative pivoting movement therebetween.

3. The valve element as defined in claim 2 wherein the second strip substantially completely covers all portions of the second face of the first sheet that are not covered by the first strip.

4. The valve element as defined in claim 2 wherein the first strip and the second strip each have a straight edge that extend in parallel to one another and define the said gap.

5. The valve element as defined in claim 4 wherein the first sheet is generally rectangular in shape and wherein the first and second strips extend longitudinally thereof.

6. The valve element as defined in claim 5 wherein the second strip covers the first sheet from the gap to the second lateral side edge.

7. The valve element as defined in claim 6 wherein the first sheet is of uniform thickness.

8. The valve element as defined in claim 6 wherein the second strip is of uniform thickness.

9. The valve element as defined in claim 6 wherein the first and second strips are of uniform thickness.

10. In a pressure relief valve of the type comprising a valve body with an opening therethrough and a flap valve element mounted to extend over the opening, the improvement wherein the flap valve element comprises a first imperforate sheet of a relatively soft elastomeric material having opposed first and second faces and a peripheral edge including first and second spaced lateral side edges, a relatively narrow strip of rigid plastic bonded to the second face to extend along the first lateral side edge with fasteners extending through the strip into the valve body to join the flap valve element to the valve body with the first face of the first sheet engaging the valve body about the opening, and a second strip of relatively rigid plastics material bonded to the second face of the first sheet at a location closely adjacent the first strip and extending from the first strip to the second lateral edge.

11. The improvement as defined in claim 10 wherein there is a narrow gap between the first and second strips to permit relative pivoting movement to take place therebetween.

12. The improvement as defined in claim 11 wherein substantially the entire second face of the first sheet is covered by the first and second sheets.

13. The improvement as defined in claim 11 wherein the gap is defined by closely spaced and generally parallel side edges on the first and second strips.

14. The improvement as defined in claim 11 wherein the first sheet is of rectangular shape with the first and second strips extending in the length direction thereof.

15. The improvement as defined in claim 11 wherein the first face of the first sheet is smooth and generally planar.

* * * * *